Sept. 5, 1944.    I. O. MINER    2,357,341
FLOW CONTROLLER
Filed July 10, 1940    2 Sheets-Sheet 1
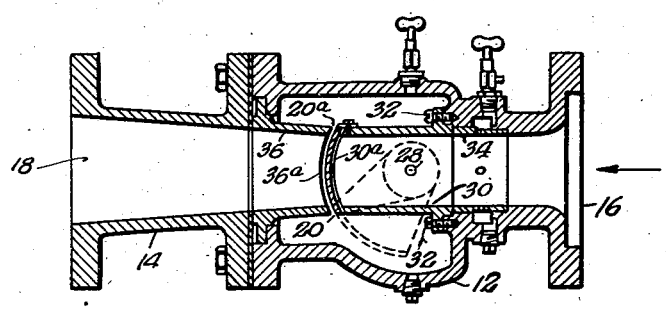
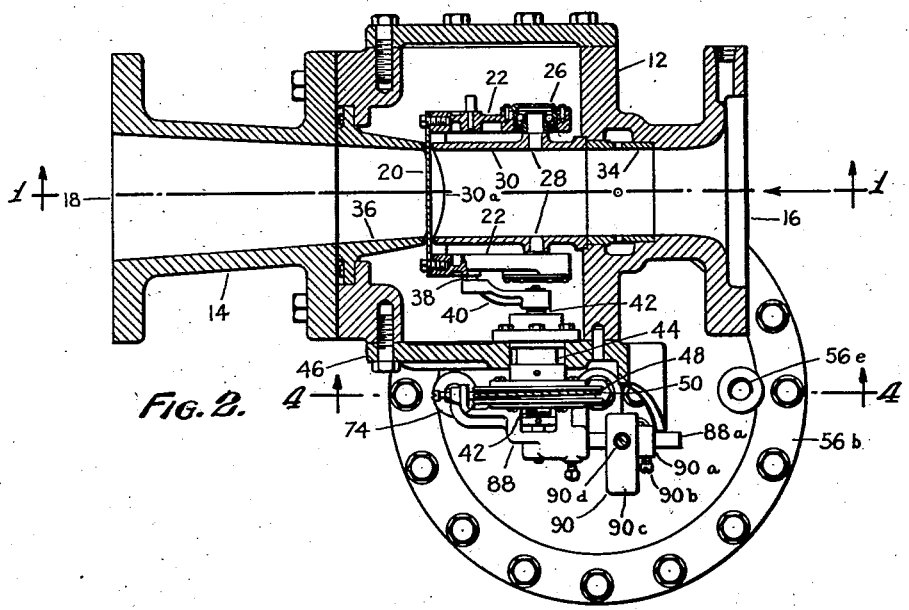
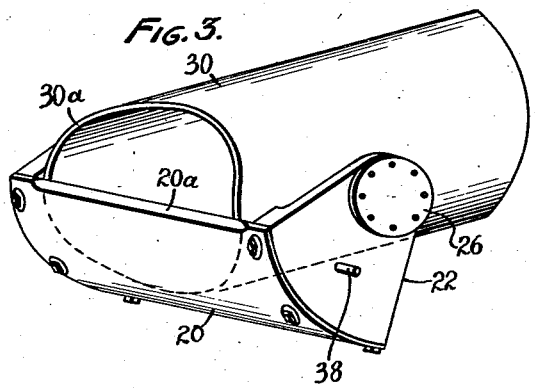
Irving O. Miner
INVENTOR
BY Harry Dexter Peck
ATTORNEY

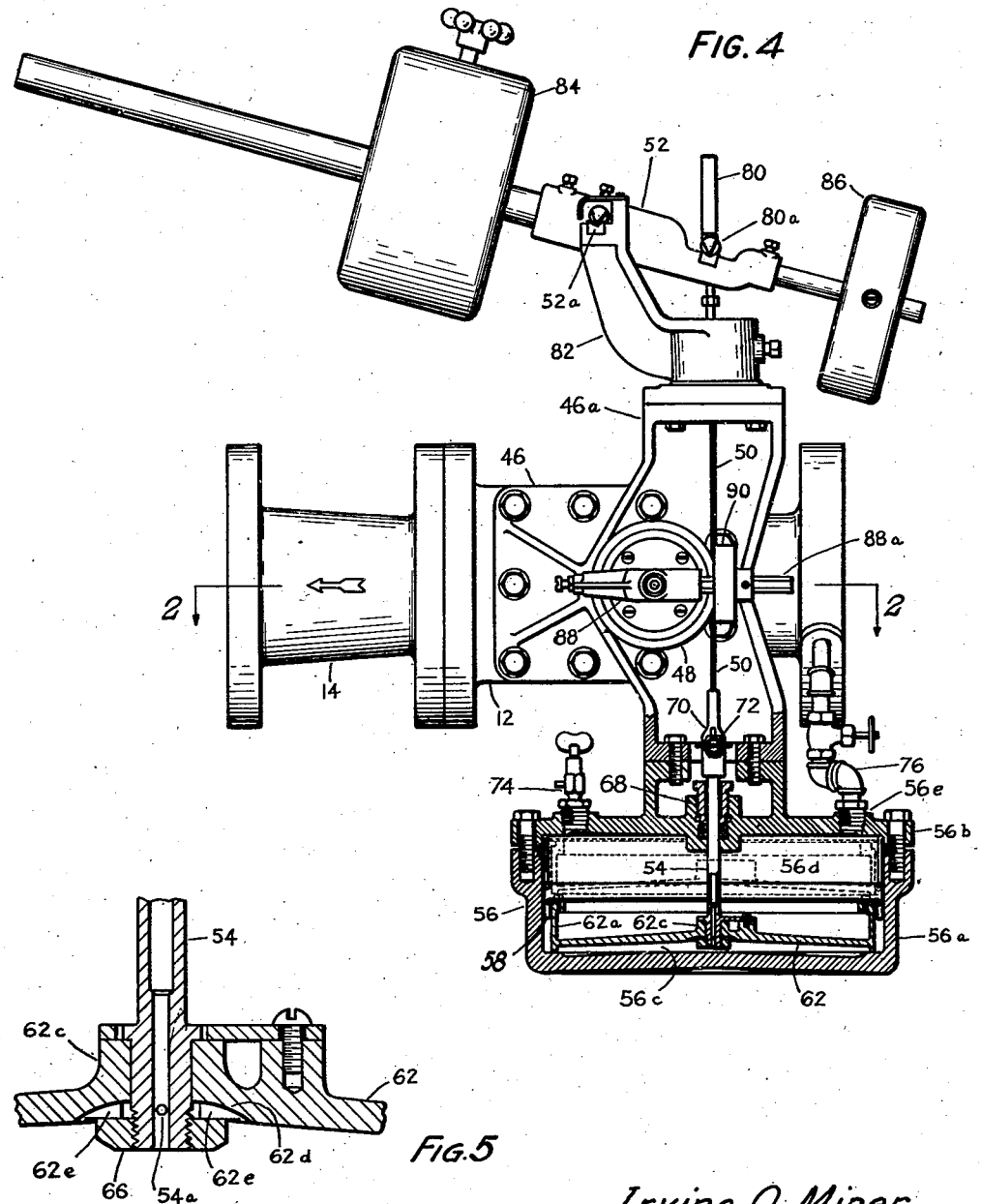

Patented Sept. 5, 1944

2,357,341

UNITED STATES PATENT OFFICE 2,357,341

FLOW CONTROLLER

Irving O. Miner, Rumford, R. I., assignor to Builders Iron Foundry, Providence, R. I., a corporation of Rhode Island Application July 10, 1940, Serial No. 344,640

6 Claims. (Cl. 251—18)

This invention relates to improvements in flow controllers. It has to do with a direct acting controller wherein the flow area in the recovery portion of a Venturi shaped passage is changed in accordance with variations in the effective head causing flow, to the end that the rate of flow is maintained substantially constant.

One instance where it is desired to have the rate of flow substantially uniform even though the effective head causing the flow varies, occurs in the discharge from a filter bed of a water purification plant. When the bed is comparatively clean the liquid can pass readily through the filtering material (such as sand) and unless controlled will flow through the discharge line at a relatively high rate. As the filtered matter collects in the sand the passage of the liquid through the bed is materially hindered and in consequence the discharge flow falls off. This is so even if the surface of the liquid in the filter bed is maintained at a constant level above the discharge outlet because the increasing resistance to flow offered by the filtering material as it collects the foreign matter reduces the effective head causing flow at the outlet. To maintain a substantially uniform rate of flow in the discharge line a controller is provided therein which is set under the maximum effective head available to provide a restricted flow area which permits the desired rate of flow to occur when such maximum effective head prevails and which controller will automatically in response to a decreasing effective head provide a larger flow area so that substantially the desired rate of flow will be maintained.

It is among the objects of this invention to provide in a controller of the type referred to an improved area controlling element and its associated flow passage which will enhance the recovery of static pressure and lessen the friction losses in the controller. Another object is to provide a novel counterbalance for such element and its allied moving parts.

The best mode in which I have contemplated applying the principles of my invention is shown in the accompanying drawings but these are to be taken as merely illustrative because it is intended that the patent shall cover by suitable expression in the appended claims whatever features of patentable novelty exist in the apparatus disclosed.

In the accompanying drawings:

Figure 1 is a vertical section, taken as on line 1—1 of Figure 2, of a controller embodying the features of my invention;

Figure 2 is a plan view in section, taken as on line 2—2 of Figure 4;

Figure 3 is a perspective of the blade and certain associated parts;

Figure 4 is a side elevation of the controller, partly in section as on line 4—4 of Figure 2; and Figure 5 is an enlarged view of certain details.

Referring to the drawings, and particularly to Figure 1, the controller comprises an inlet and body section 12 and what may be termed a discharge or recovering section 14, although as will later appear it is a feature of the invention to provide a portion of the recovery cone within the body section itself. The inlet 16 of the body section is connected to a source of supply (not shown) and the outlet 18 of the so-called recovery section is connected to a discharge line, (also not shown) in which it is desired that the rate of flow shall be maintained substantially constant. The rate of flow through the controller and consequently in the discharge line is regulated by varying the cross sectional flow area of the passageway through the so-called recovery cone, this being accomplished by means of a movable area controlling element 20 hereinafter called a blade, which is automatically positioned in the path of flow.

The blade 20 is a curved plate secured to arm sectors 22, whose hubs are mounted on friction-reducing bearings 26 which in turn are mounted on trunnions 28 provided at the sides of a tubulated member 30 which is clamped to the body 12 by a series of bolts 32. This tubulated member 30 together with an internal sleeve member 34 constitutes the throat or flow area of smallest diameter in the venturi. At its discharge end the tubular member 30 has a curved edge 30a shaped to permit the curved blade 20 to swing upward or downward in close proximity to but not touching the said curved edge 30a.

Extending from close by the blade to the discharge end of the body section is another tubulated section 36 which constitutes a portion of the recovery passage of the controller. Its internal dimension adjacent the blade is of substantially the same size as that of the discharge end of the tubulated section 30, but its diameter gradually increases toward its discharge end where it is of such size as to register with the entrance end of the cone passage through the so-called recovery cone section 14.

The top edge 20a of the blade is straight across and preferably beveled to a fairly sharp edge as shown. Being straight, the length of the edge across which the liquid flows decreases as the blade moves toward the closed position. This reduces the tendency for the flowing liquid to suck the blade to its fully closed position, renders the controller more stable near closed position, and permits a finer setting of the blade.

From a pin 38 on an arm sector 22, a crank 40 joins a shaft 42 which extends through a suitable fluid-tight bearing 44 in a cover plate 46 on the body section 12. The axis of this shaft is in alignment with the axis of the trunnions 28 about which the sector arms and blade swing. A grooved pulley 48 is mounted on shaft 42 outside the body casing and around this is a cable 50 which forms a connection between a balance beam 52 near the top of the apparatus with a piston rod 54 extending into a casing or cylinder 56 near the bottom of the apparatus. This cylinder has a base member 56a and a cover member 56b secured together by bolts.

Between the two members of the cylinder is clamped a diaphragm 58 made of rubber or other suitable pliable material. This diaphragm extends downward along the inner wall of the cylinder and then folds upward to where it is secured to the upper edge of an upstanding skirt 62a of a piston 62. When the piston 62 is in its uppermost position of travel, with its top resting against the cover member 56b, as shown in dotted outline in Figure 4, the diaphragm lies downward along the face of the skirt to substantially its bottom edge and then folds across the space between the skirt and the inner vertical wall of the cylinder base. As the piston moves downward, the diaphragm leaves the face of the skirt and lies along the wall of the base 56a. The lowermost positions of the piston and diaphragm are shown in full lines in Figure 4. It has been found in practice that best results are attained by making the space between the wall of the cylinder and the face of the skirt equal to approximately six times the thickness of the diaphragm. This relation gives ample room for the necessary movements of the diaphragm and yet prevents any undesired buckling or displacement thereof.

The plate portion of the piston 62 is inclined from its outer edge upward toward an upstanding hub 62c at its center. Below this hub, (Figure 5) on the inner face of the plate is a partially spherical depression 62d having separated outstanding bearing lugs 62e providing bearing surfaces for a nut 66 which is screwed onto the lower end of the piston rod 54. The latter is tubular, extends upward through a stuffing box 68 and is secured to a connection block 70 to which is also attached the cable 50. This block is bored to provide a passageway from the hollow of the tubular piston rod 54 to a relief cock 72 screwed into the block. When liquid is introduced to chamber 56c below the piston 62, all the air or gas in this chamber will, by virtue of the inclination of the plate portion, the depression 62d, and ports 54a in the piston rod, pass into the hollow of the piston rod and escape to atmosphere by way of the cock 72, thus insuring that only liquid will be contained in the lower chamber 56c. The chamber 56d above the piston may likewise be freed of all air or gas through another relief cock 74 mounted in the top wall of the cover member 56d.

The two chambers 56c and 56d are each connected with the Venturi shaped passage. From the cross-section area of maximum extent a pipe 76 leads to an inlet 56e to the upper chamber 56d and from the cross-section area of minimum extent in the venturi another pipe leads to an inlet to the lower chamber 56c. As is well known, when flow occurs through a Venturi shaped passage the pressure of the liquid at the larger flow area is always higher than the pressure at the throat or smallest flow area. The pressures conducted from these two areas to the chambers 56c and 56d accordingly subject the piston and diaphragm to different pressures on their opposite sides, the higher pressure being imposed in the upper chamber 56d and tending to move the piston downward, while the lower pressure is imposed in the lower chamber 56c and tends to move the piston upward. Obviously, since the pressure in the upper chamber is always the greater, the piston, so far as the pressures alone can control, would always remain in its lowermost position. When in this position, the relation of the cable 50 and pulley 48 is such that the blade 20 is in its uppermost position substantially closing the flow passage through the so-called recovery cone.

The tendency of the difference between the upstream and throat pressures to close the blade is balanced by the setting of weights on a balance beam so as to maintain a blade opening which will produce the desired rate of flow through the controller. The upper end of the cable 50 is attached to a holder 80 (Figure 4) which is provided with knife edges 80a that rest in suitable seats provided on a balance beam 52. The details of this connection are not important except that it is desired to provide means for taking up any slack in the cable and to be sure that the pull of the cable on the balance beam is direct and without twisting or torsional effect on the beam. The latter in turn is also provided with knife edges 52a which rest on seats afforded by a bracket 82 mounted on a support 46a cast with the cover member 46. A large weight 84 is slidable on the beam on one side of its fulcrum and a smaller weight 86 is similarly slidable along the beam on the opposite side of its fulcrum.

At the end of the shaft 42 is secured an arm 88 having a portion 88a thereof extending away from the shaft on the side opposite that on which the blade 20 extends. On this portion 88a is mounted a novel counterweight 90 having a hub 90a (Figure 2) which can be secured to the arm by a set screw 90b. On an eccentric portion of this hub is mounted a weight 90c, which turns about the eccentric portion, being securable in any desired position by another set screw 90d. Thus by moving the counterweight 90 as a whole along the arm portion 88a and by rotating the weight 90c eccentrically about the hub 90a a true counterbalancing of the blade 20 and arms 22 and 40 can be effected.

To effect this counterbalancing the counterweight 90 is moved along the arm 88a until the weight tending to turn the shaft 42 clockwise times the effective moment arm of such weight with respect to the horizontal axis of rotation (which passes through the shaft 42 and the trunnions 28) is equal to the weight tending to turn the shaft 42 counterclockwise times the effective moment arm of such weight with respect to the same horizontal axis. Assuming all weight tending to effect clockwise motion of shaft 42 is active at a center of gravity and all weight tending to effect counterclockwise motion is active at another center of gravity, then the counterweight 90 can be adjusted along the arm 88a to make the moment arms of these centers of gravity in inverse proportion to the assumed weights acting at these centers of gravity.

The eccentric adjustment of counterweight 90 about the hub 90a, is to enable the assumed centers of gravity to be brought into an imaginary line intersecting the horizontal axis of rotation. In other words, by proper adjustment of the counterweight eccentrically, this horizontal axis of rotation and an imaginary line passing directly between the assumed centers of gravity on opposite sides of said axis, will be in a plane. By this combined adjustment of the counterweight 90 along the arm 88a and eccentrically about the hub 90a, the blade and its mounting will be counterbalanced at every position the blade may assume in its path of movement.

When the maximum effective head is available and the blade is positioned in the flow passage to permit the desired quantity of liquid to flow in the discharge line, the upwardly acting forces, namely the large weight 84 and the low pressure in the lower chamber 56c are counterbalanced by the downwardly acting forces, namely, the smaller weight 86 and the high pressure in the upper chamber 56d. Thus the moving elements remain fixed so long as the effective head causing flow remains unchanged. But when the effective head is reduced for one cause or another it will first tend to decrease the rate of flow and lessen the difference in pressures in chambers 56d and 56c. The resulting action of the controller will be to raise the piston 62 thereby lowering the blade 20 which in turn allows an increased flow through the controller which, restores the initial pressure conditions. Accordingly the movable parts are all again in balance and the blade will remain in its adjusted position so long as the assumed head is effective. If for any reason this head should increase the reverse reactions will occur with consequent movement of the blade toward a more closed position. Usually, however, the expected changes are in the direction of further reduced effective heads with consequent further opening of the blade until it reaches its final wide open position.

In its wide open position the blade of course has no effect on the flow. This is as it should be because the effective head is greatly lessened. Under such conditions the recovery cone of the controller should be most effective, as indeed it is, because with the blade out of the way the liquid passes easily from the cylindrical member 30 to the tubulated member 36. The edge 36a of this inserted cone section 36 is curved to accommodate the curvature of the blade.

I claim:

1. In a flow controller for maintaining a desired rate of flow under a variable effective head causing flow, a Venturi-shaped passage through the controller having a curved slot across it, a curved blade within said controller rotatably mounted about an axis and movable along said slot to vary the flow area of said passage; and counterbalancing means associated with said blade and its mounting having an arm extending radially from said axis and an element adjustable along and eccentrically about said arm to bring an imaginary line passing directly between the center of gravity of the blade and its mounting and the center of gravity of the counterbalancing means in a plane containing the said axis of rotation of the blade.

2. In a flow controlled for maintaining a desired rate of flow under a variable effective head causing flow, a body casing having Venturi-shaped passage therethrough with a curved slot in the wall of said passage, a curved blade mounted in the casing for rotation about a horizontal axis and movable along said slot across the said passage to vary the flow area thereof, and means associated with said blade and its mounting extending outside the said casing, comprising an arm extending radially from said horizontal axis, a counterweight adjustable along said arm to make the moment arms of the weight tending to cause counterclockwise rotation about said axis and the weight tending to cause clockwise rotation about said axis inversely proportional to the said weights, said counterweight being also adjustable eccentrically about said arm to make an imaginary line passing directly between the centers of gravity of said weights intersect the said horizontal axis.

3. In a flow controller for maintaining a desired rate of flow under a variable effective head causing flow, a Venturi-shaped passage with a curved slot across it, a curved blade mounted for rotation about a horizontal axis and movable across said slot to vary the flow area of said passage, and means for counterbalancing said blade and its mounting extending outside the controller having an arm extending radially from said horizontal axis with a counterweight thereon adjustable radially with respect to said axis and eccentrically with respect to said arm; the said radial adjustment being provided to make the moment arm of the counterweight and its supporting arm and the moment arm of the blade and its mounting inversely proportional to the respective weights of the counterweight and its supporting arm and of the blade and its mounting, and the said eccentric adjustment being provided to bring an imaginary line extending between the center of gravity of the counterweight and its supporting arm and the center of gravity of the blade and its mounting into a plane passing through the said horizontal axis.

4. In a flow controller for maintaining a desired rate of flow under a variable effective head causing flow, a body casing having an inlet passage whose flow area decreases in the direction of flow; a removable tubular member secured internally within the said casing having a passage whose flow area is substantially uniform and substantially equal to the flow area of the discharge end of said inlet passage; a second removable tubular member secured internally within the said casing having a passage whose flow area increases in the direction of flow from the flow area of the other tubular member; said tubular members being separated by a curved slot; and a curved blade rotatably mounted within said casing and movable along said slot to vary the flow area of the passage through said tubular members.

5. In a flow controller for maintaining a desired rate of flow under a variable effective head causing flow, a body section providing an inlet flow passage of decreasing flow area in the direction of flow; a recovery section secured to said body section providing an outlet flow passage of increasing flow area in the direction of flow; removable tubular members secured within the body section providing a flow passage between said inlet and said outlet flow passages; one of said tubular members having a passage extending from the inlet passage with a flow area substantially uniform and substantially equal to that of the discharge end of said inlet passage; another of said tubular members having a passage of increasing flow area extending from close by the discharge end of said substantially uniform passage to the entrance of the passage in said recovery section; the said tubular members being separated by a curved slot; and a curved blade rotatably mounted within said body section and movable along said slot to vary the flow area of the passage through said tubular members.

6. In a flow controller for maintaining a desired rate of flow under a variable effective head causing flow, a body section providing an inlet flow passage of decreasing flow area in the direction of flow followed by a flow passage of substantially uniform flow area; a recovery section providing an outlet flow passage of increasing flow area in the direction of flow; a removable tubular member secured within the body section providing a flow passage of increasing flow area extending from close by the discharge end of said substantially uniform passage to the entrance of the passage in said recovery section, there being a curved slot between the discharge end of said passage of substantially uniform flow area and the entrance end of said removable member; and a curved blade rotatably mounted within said body section and movable along said slot to vary the flow area of the passage through the controller.

IRVING O. MINER.